Oct. 10, 1967    M. F. PETERS    3,345,725
METHOD OF EXTENDING THE USEFUL LIFE
OF SURGE ATTENUATING DEVICES
Original Filed June 13, 1962    2 Sheets-Sheet 1

INVENTOR.
MELVILLE F. PETERS
BY
*Albert F. Kronman*
ATTORNEY

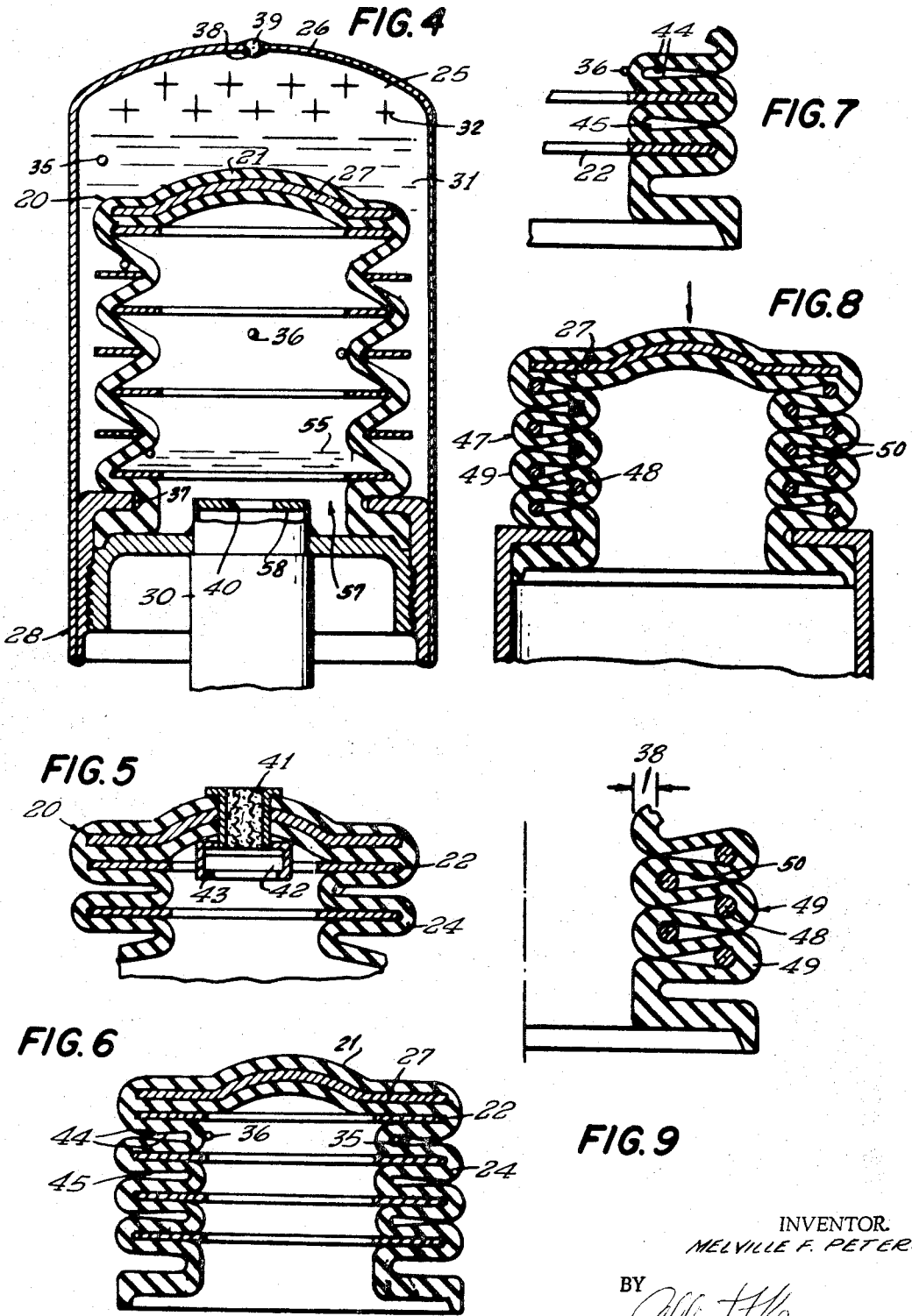

United States Patent Office 3,345,725
Patented Oct. 10, 1967

3,345,725
METHOD OF EXTENDING THE USEFUL LIFE
OF SURGE ATTENUATING DEVICES
Melville F. Peters, 29 N. Ridge Road,
Livingston, N.J. 07039
Original application June 13, 1962, Ser. No. 202,274, now
Patent No. 3,162,213, dated Dec. 22, 1964. Divided
and this application Sept. 17, 1964, Ser. No. 397,262
7 Claims. (Cl. 29—157)

ABSTRACT OF THE DISCLOSURE

A surge suppressor having a cup-shaped elastomer bellows formed with a plurality of transverse corrugations, within a chamber is kept operative for long periods of time by partially filling the chamber with a fluid under pressure to keep the elastomer bellows under compression at all times during the operation of the surge suppressor.

This invention relates to a method of making devices for attenuating pressure surges in fluid lines and particularly to fluid surge suppressors, and is a division of an application filed June 13, 1962, Ser. No. 202,274, now Patent No. 3,162,213, entitled Surge Attenuating Devices, by Melville F. Peters.

Presently known surge suppressors consist of a fluid tight housing closed at one end and connected at its other end to a line bearing fluid subject to transient pressure waves. A flexible element such as a metal bellows, elastomer bag, or diaphragm is carried within the fluid tight housing and divides it into two chambers. One of the chambers is in communication with the fluid in the line. The other chamber is hermetically sealed.

Metal bellows used as the flexible element have proved expensive, difficult to manufacture, fragile, and too large and heavy for many purposes. The elastomer bag and diaphragm have not proved satisfactory because of their inability to withstand the fluid pressure initiated during the passage of the pressure waves. As hereinafter more fully set forth, these forces result not only from the static and surge pressures in the lines which generally do not exceed 1000 p.s.i., but also from the phenomenon of cavitation caused when cavities created in the fluid are collapsed by the oscillating pressures in the surge suppressor, which may produce localized pressures between 50,000 and 500,000 p.s.i.

Accordingly, it is an object of the present invention to provide a method of making surge suppressors in which the flexible element is an elastomer bellows capable of withstanding the forces created during the operation of the suppressor.

Another object of the present invention is to provide a method of making a surge suppressor in which the flexible element is protected from the effect of cavitation by being under compression during the formation and collapse of cavities.

An object of the present invention is to provide a method of maintaining the elastomer flexible bellows under compression at all times so as to decrease its rate of oxidization and chemical change thereby prolonging its life.

An object of the present invention is to provide a method of making a surge suppressor which will remain operative over long periods of time without need for servicing or adjustment.

Another object of the present invention is to provide a method of making a surge suppressor which will maintain its charging pressure over long periods of use.

Another feature of the present invention is to provide a method of making an elastomer bellows having a structure that allows the flexible member to withstand the fluid pressures set up within the chambers without stretching or compressing the elastomer beyond a small portion of its safe working range.

In the accompanying drawings, forming a part hereof are illustrated several forms of embodiment of the invention, in which drawings similar reference characters designate corresponding parts, and in which:

FIGURE 4 is a view similar to FIGURE 3, showing the surge suppressor under the influence of the high pressure portion of a transient pressure wave.

FIGURE 5 is a fragmentray vertical section of an elastomer bellows showing the use of a semi-permeable membrane assembly, another embodiment of the present invention.

FIGURE 6 is a vertical section through an elastomer bellows having supporting rings internally carried by the bellows where pressure requirements are not as rigorous as those illustrated in the embodiments shown in FIGURES 1–4.

FIGURE 7 is a fragmentary view somewhat enlarged of the bellows assembly shown in FIGURE 6.

FIGURE 8 is a vertical section of a nested elastomer bellows employing rings of circular cross-section.

FIGURE 9 is a fragmentary view somewhat enlarged of the structure shown in FIGURE 8.

Figure 1:
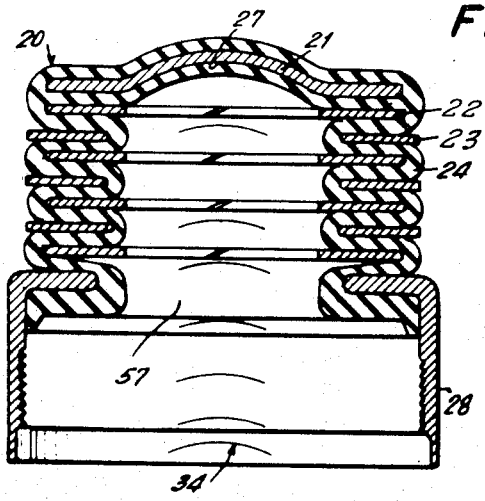
FIGURE 1 is a vertical section taken through an elastomer bellows made in accordance with the present invention showing the supporting ring and dome structures, said bellows being in a nested position.

If a surge suppressor made in accordance with the following description or in accordance with any of the prior art structures is provided with a transparent housing and inlet pipe, it will be observed that the transient pressure wave will initiate bubbles of gas ranging in diameter from ¼ inch or larger to diameters small enough to be invisible to the naked eye but numerous enough to give the liquid in the pressurized chamber a milky appearance. Bubbles of gas covering a wide range of diameters will also be observed in the water in the inlet pipe, providing the water contains dissolved or suspended bubbles of gas.

When the frequency of oscillation of the surge suppressor is not greater than 10 c.p.s., it is possible to observe during the life of the transient pressure wave a decrease in size of the larger gas bubbles when the pressure is increasing and an increase in their size when the pressure is decreasing (where an increase in pressure is indicated by the flexible element elongating and a decrease in pressure is indicated by the element shortening). Besides these visible changes in bubble size, changes take place in the liquids which make it impossible to operate the conventional flexible elements made from elastomers for more than a few cycles without punching holes in the elements. These holes are punched by the high pressures initiated in the gas filled liquids in the surge suppressor when the pressure in the surge suppressor is suddenly reduced by the transient pressure wave. These observations agree with the destructive forces generated with and immediately following the instantaneous closing of a valve in a fluid bearing line.

Surge suppressors are constructed so that the transient pressure wave will not increase the pressure in the system by more than 50 or 60 p.s.i. above the static pressure, which in the plumbing industry limits the static pressure to 50 p.s.i. During the first quarter cycle following a valve closure, the transient pressure wave reaches its peak value and increases the pressure in the pressurized chamber of the surge suppressor to the combined pressure of the static pressure and the peak transient pressure. This increase in pressure will cause some of the undissolved bubbles of gas to dissolve in the liquid in the pressurized chamber and in the water in the flexible element of the surge suppressor. During the next quarter cycle the pressure in the water system will be reduced to its static pressure and during the following quarter cycle the pressure in the water system will be further reduced. Both the liquid in the sealed chamber and in the system have experienced a rapid increase in pressure followed by a rapid decrease in pressure or rarification. This rarification causes both the dissolved and mechanically suspended gasses in the liquids to expand. When this rarification takes place in a liquid having a relatively low viscosity or one which does not have other means to limit the rate of bubble collapse, localized pressures are developed in the liquids, which range from 50,000 to 500,000 p.s.i. These pressures are the well known pressures which are developed during cavitation and are not only great enough to punch holes in the elastomers but are powerful enough when initiated by propellers to blast or chip metal out of the blades. It is these forces developed by cavitation and sometimes referred to as the "pick" effect which are initiated during the phenomenon known as water hammer and which explain the previous failure of such flexible elements as elastomer bags, diaphragms, etc., within surge suppressors.

Experience has shown that elastomer bags and diaphragms are easily punctured when under tension and very difficult to puncture when under compression. In the conventional surge suppressor using elastomer bags or diaphragms the elastomer must be stretched to function as a flexible element and consequently it is operated under tension. In the embodiment set forth and described herein it will be observed that the elastomer bellows employed is under compression at all times. This compression greatly improves the ability of the flexible member to withstand the extremely high localized pressure developed during cavitation.

The rate at which the cavity or bubble will collapse in a liquid free of foreign bodies, depends upon the pressure, the rate of pressure change and the viscosity of the liquid containing the dissolved gas.

Figure 2:
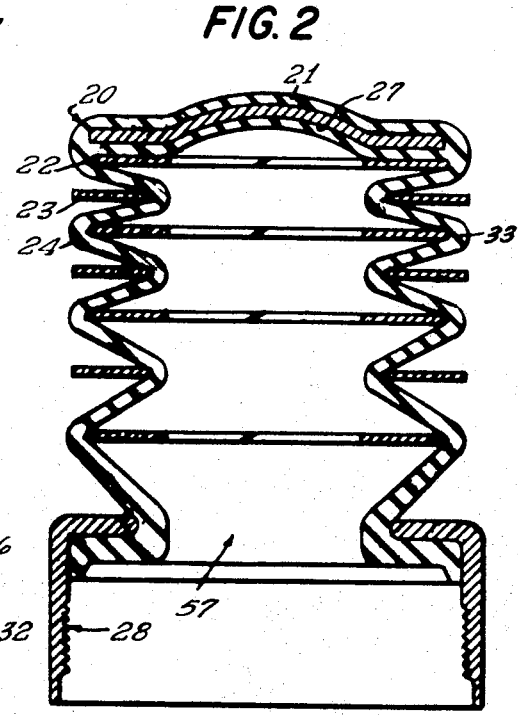
FIGURE 2 is a view similar to FIGURE 1, showing the bellows in an extended state.
Figure 3:
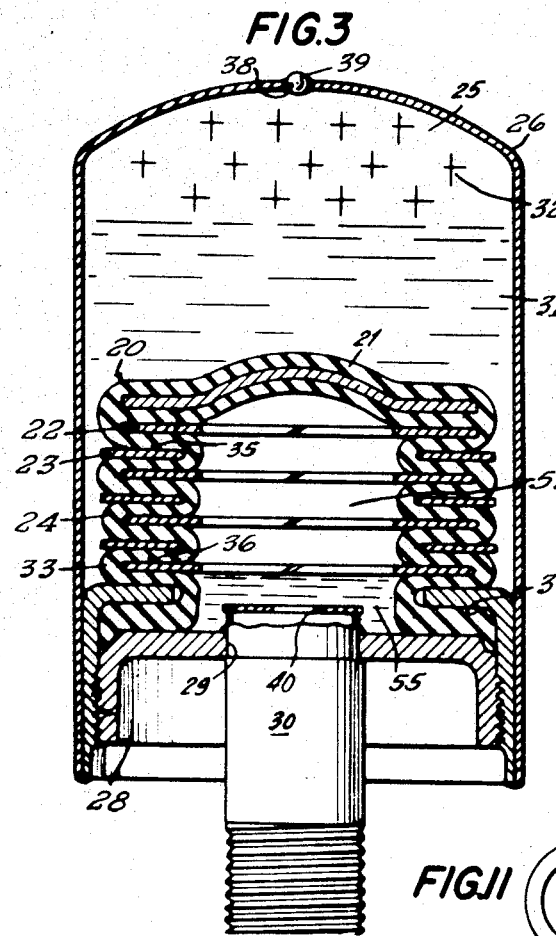
FIGURE 3 is a vertical section taken through a complete embodiment of the present invention.

Referring to the drawings and particularly to FIGURES 1–4, 20 indicates an elastomer bellows formed of neoprene, rubber, silicone rubber or the like. A dome shaped cap 21 is molded into the upper portion of the elastomer bellows to close the bellows at that end. The dome shaped cap 21 is part of the supporting structure of the elastomer bellows 20. The remainder of the bellows supporting structure consists of a series of washer shaped rings 22, 23, which are alternately placed inside and outside of the convolutions 24 of the bellows 20 as shown in FIGURES 1–3. The washers 22, 23 are disposed so that they prevent the bellows 20 from collapsing completely and seal the flat surfaces of the convolutions 24 when the transient pressures developed during surges such as water hammer, bring the combined transient and static pressure below the pressure in the pressurized chamber 25. The chamber 25 is formed between the outside surface of the bellows 20 and the interior of the housing 26 which is disposed around the bellows.

The inside diameter of the rings 22 are equal to or slightly larger than the inside diameter of the convolutions 24 of the bellows 20. The outside diameter of the rings 22 bear against the inner surface of the convolutions 24. The outside diameter of the rings 23 generally conform to the outside diameter of the convolutions 24 in size and the inside diameter of the rings 23 is of a size which will cause them to bear lightly against the outside of the roots of the convolutions 24. The dome shaped cap 21 is preferably formed with a concave inner surface 27 which conforms in size to the inside diameter of the convolutions 24. It will be seen that a tubular column is formed when the elastomer bellows 20 and its supporting members are in the nested position as shown in FIGURE 1. The elastomer in this column is in compression and in the compressed state it is capable of withstanding extremely high pressures and to resist the effects of cavitation as hereinafter more fully described.

The bottom convolution of the elastomer bellows is secured to a base 28 which in turn is attached to the inner walls of the housing 26. It will be observed that the housing 26 is closed at its upper end and open at its lower end to receive the base 28. The base 28 is provided with a restricted opening 29 therein to receive a fitting 30 whereby the surge suppressor can be incorporated into a fluid bearing line or system.

Since the static pressure in the system to which the surge suppressor is connected is fixed and cannot be changed, other means for protecting the flexible member from the effect of cavitation must be provided. The rate of pressure change of the liquid flowing between the surge suppressor and the system can be decreased by restricting the size of the opening 40 in the conduit or fitting 30, connecting the surge suppressor to the system. In addition, the chamber 25 in the housing 26 can be partially filled with a liquid 31. The viscosity of the liquid 31 within the chamber 25 can be made as great as 1000 poises. A suitable liquid having such viscosity may be thick molasses. The present invention makes use of both of these methods of protecting the bellows 20 without interfering with the efficiency which may be obtained from the surge suppressor.

As an example of the improved efficiency which can be obtained by increasing the viscosity of the liquid and decreasing the inlet opening, tests were made with a surge suppressor, such as is shown in FIGURES 1–4, using a liquid in the hermetically sealed chamber 25 with a viscosity of 0.01 poise, and allowing the liquid in the system to circulate between the surge suppressor and the system through a ¾ inch inlet pipe or fitting 30. The elastomer bellows 20 failed before 25 instantaneous valve closures.

When a liquid having a viscosity of two poises was substituted for the lower viscosity liquid in the chamber 25 and a diaphragm 58 with a ⅜ inch opening 40 was placed within the fitting 30, allowing the bellows to move through a 25% greater volume change to maintain the intensity of the transient pressure wave after the modification of the surge suppressor at the intensity it had before, the suppressor was able to withstand 25,000 instantaneous valve closures without failure.

As stated above, the elastomer bellows described herein are operated under compression at all times. Such bellows are possible because they are molded in the extended position as shown in FIGURE 4. When the surge suppressor is assembled, a quantity of gas indicated at 32 in FIGURE 3 is pumped into the chamber 25 at a suitable pressure. The gas 32 fills the chamber above the liquid 31 and is preferably at 50 lbs. per sq. inch, which in the plumbing industry is an average value for the static pressure in the system. Since the pressure in the pressurized chamber 25 exceeds the static pressure in the fluid system to which the surge chamber is connected, the elastomer bellows 20 is compressed or nested during normal operating pressures. When the cavities or bubbles are collapsing only the inner and outer periphery of the bellows convolutions 24 are in contact with the liquids in the pressurized chamber 25 and in the system. To increase the resistance of the bellows to the destructive effects of cavitation the rounded portions of the convolutions 24, are made thicker as compared with the flat portions which rest upon the washer-shaped rings 22, 23. Another advantage of maintaining the elastomer in the bellows in a compressed state throughout its operating cycle is a reduced rate of diffusion of fluids through the elastomer and a very great reduction in the rate of chemical and physical deterioration of the flexible assembly.

Figure 11:
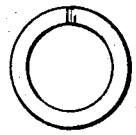
FIGURE 11 is a top plan view on a reduced scale of a supporting ring made in accordance with the present invention.

Since an elastomer will swell and increase slightly in size as a result of absorption of liquids, it is within the purview of the present invention to make each of the rings 22 a split ring in the manner shown in FIGURE 11, so that they have a slight tendency to spring outwardly and bear against the inner surface of the convolutions 24. In this manner, the convolutions will be firmly supported by the rings at all times.

When an intense pressure wave, indicated at 34 in FIGURE 1, reaches the surge suppressor the elastomer bellows 20 will be extended as shown in FIGURES 2 and 4. As the bellows 20 extends, the gas 32 in the pressurized chamber 25 is compressed and cavities indicated at 35 in FIGURE 4, which were previously formed in the liquid 31 in the pressurized chamber 25 will collapse. Other cavities indicated at 36 in FIGURE 4 may form within the liquid inside the elastomer bellows 20. This expansion of the bellows will continue until the pressure of the compressed gas in the chamber 25 has absorbed the energy originally in the fluid. At the instant the fluid in the system has experienced its maximum change in velocity, which usually means the fluid has been brought to rest, the transient pressure will have reached its maximum value and the pressure of the compressed gas 32 in the surge chamber will be equal to the pressure in the system. This high pressure wave developed by superimposing the transient pressure wave upon the static pressure in the system, will have a life in most instances of a few milliseconds. However, during the lifetime of the high presssure wave its magnitude must not exceed some predetermined value if the noise commonly known as "water hammer" is to be eliminated.

Following the high pressure wave is a rarification wave. During the rarification wave the pressure in chamber 57 within the bellows 20 will be reduced below the static pressure in the system. During this period the bellows 20 will nest and the pressure in chamber 25 will be reduced from the peak pressure in the system, which is equal to the sum of the static and peak transient pressures, to the pressure in the pressurized chamber 25 when the bellows 20 is nested. In both chambers 25, 57, a sudden reduction in pressure has taken place during the rarification wave. This sudden reduction in pressure causes both the dissolved and mechanically suspended gases and vapors to expand. When this rarification takes place in a short period of time, cavities will collapse and develop localized pressures in the liquid which range from 50,000 to 500,000 p.s.i. The elastomer, however, remains in the compressed condition during the cycle of elongation of the bellows by the increasing pressure wave and the immediate nesting of the bellows, by the rarification wave, since the bellows is not allowed to elongate enough as shown in FIGURE 4, to put the elastomer in tension. With the bellows in the nested position as shown in FIGURE 1, the flat washer shaped rings 22, 23, and the dome 21, prevent the elastomer bellows 20 from collapsing and isolate the flat surfaces of the convolutions from the collapsing cavities. Thus only the inner and outer peripheries of the bellows convolutions come in contact with the liquids in chamber 57 and in the pressurized chamber 25, respectively, when the cavities are collapsing. During this period the elastomer on the outer surfaces of the convolutions can be maintained without appreciable stretching by selecting washers of a thickness which cause adjacent flat surfaces to be parallel when the bellows is nested.

During the period when the elastomer bellows 20 is nested, liquid containing particles of dissolved gas indicated at 35, 36, in FIGURE 3, will be sealed between the inside convolution surfaces of the elastomer bellows 20 and the rings 22, 23. However, the dissolved gases in the liquid will be hermetically sealed by the nested bellows from the pressure changes taking place between the chamber 25 and the system, providing the frequency of the transient pressure wave is slow enough to eliminate an appreciable lag between the position of the bellows assembly 20 and the pressure differential operating on the bellows.

When the fitting or inlet conduit 30 is not restricted, as shown in FIGURES 1 and 2, the pressure in the chamber 25 is in phase with the pressure in the system. Since the bellows assembly has inertia the nesting and unnesting of the bellows will usually lag slightly behind the transient pressure waves and consequently the bellows will always nest a little below the static pressure and unnest a little above the static pressure during the operation of the surge suppressor.

Elastomer bellows such as are herein disclosed have specific advantages over elastomer bags, membranes or metal bellows when used in surge suppressors. Elastomer bellows have a low spring constant. In the bellows illustrated in FIGURES 1–4, the spring constant does not exceed one or two ounces and the difference in pressure differential between the top and bottom convolutions does not exceed more than a few ounces. At the instant the bellows is fully extended, the pressure differential across the elastomer bellows will never exceed one or two pounds and this is not a great enough pressure differential to stretch the thick walled bellows more than a trivial amount. The bellows can therefore be said to function without stretching the elastomer.

The low spring constant of the bellows 20 allows the surge suppressor to respond and correct small pressure changes in the system. This permits the surge suppressor to be used to smooth out the pulsations from liquid systems using reciprocating pumps and reduces the pulsations reaching the pressure gages.

Surge suppressors are often placed in inaccessable locations such as between the walls in houses. It is therefore necessary for them to operate over a period of years without servicing. Because elastomers are more permeable to fluids than metals, it has been necessary when using elastomer flexible members to pressurize the surge suppressors from time to time and consequently they are not used when servicing is prohibited.

Since elastomers are permeable to fluids it is possible to use the elastomer as a semi-permeable membrane and cause fluids to diffuse into the sealed chamber 25 instead of out of the chamber. This is accomplished by using a liquid 31 in chamber 25 in FIGURE 3, which consists of a solvent and solute. The solvent and solute are selected so that the liquid 55 in chamber 57 will diffuse through the walls of bellows 20 until the pressure in chamber 25 is greater than the pressure in chamber 57. This process of causing a fluid to pass through a membrane and create a pressure differential across the membrane is known as osmosis and the pressure differential is known as osmotic pressure. The magnitude of the pressure differential can be adjusted by the proper selection of solvent and solute to cover a range of pressures having a lower value of a few ounces or less and higher value of a few hundred pound.

A surge suppressor made in accordance with this structure can be filled with the proper amount of solvent and solute at some extremely low pressure as for example, 20 or 30 p.s.i. After the surge suppressor has been installed in the system, some of the fluids in the system will diffuse into the fluids in the sealed chamber 25 and build up a pressure therein equal to the osmostic pressure plus the normal system pressure. Since the flow of fluids is always into the sealed chamber 25 and never out of it, bellows 20 will always be covered by liquid 31. This liquid seals gas 32 from the elastomer bellows 20 and consequently the gases cannot contact the walls of the bellows. In practice, a gas 32 is selected which is only slightly soluble in liquid 31. Argon has given excellent results. Surge suppressors maintaining fluids in the pressurized chamber by using osmosis to cause fluids to flow into the sealed chamber can be operated without periodic recharging.

A specific example of a liquid which will take advantage of the osmotic effect of a permeable elastomer bellows is a weak solution of sugar and water in the sealed chamber 25. The sugar and water solution will cause water from the system to flow into the chamber 25 until the gas in the chamber becomes pressurized to the osmotic pressure of the solution above the pressure in the system. Two high viscosity liquids which will cause water to flow from the system into the pressurized chamber 25 are glycerine and molasses.

Figure 10:
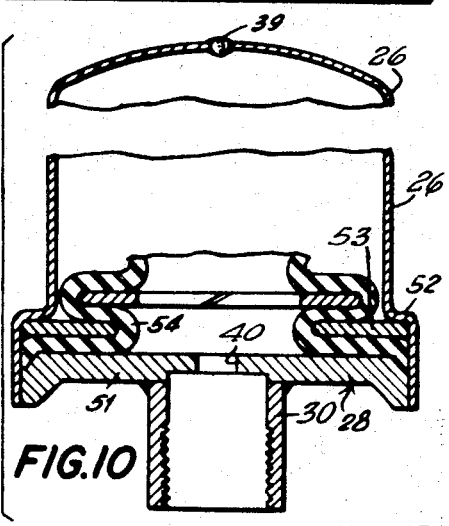
FIGURE 10 is a fragmentary vertical section of a surge suppressor showing the manner in which the elastomer bellows is secured to the base and housing.

The surge suppressor illustrated in FIGURES 1–4, is assembled by securing the elastomer bellows 20 to the base 28. The lowest convolution of the bellows 20 is first held within the groove 37 provided in the said base 28. The base 28 is then secured to the open end of the housing 26 by welding or some other suitable method. The chamber 25 is thus sealed off from the interior of the bellows 20. The liquid 31 is then introduced into the chamber 25 through an opening 38 in the top of the housing 26. The chamber 25 is partially filled with the liquid 31. Gases under pressure, indicated at 32, are then pumped into the chamber 25 and the unit is sealed as by welding a ball 39 into the opening 38. The fitting 30 may be welded into the base 28 or the base 28 may be provided with a restricted opening 40 as illustrated in FIGURE 10. When the surge suppressor is installed in accessible places, sufficient liquid 31 is put into chamber 25 to cover bellows 20 when the bellows is in the extended position.

When the elastomer bellows cannot serve as a semipermeable membrane a small semipermeable membrane may be placed between the elastomer bellows and the sealed chamber 25 as illustrated in FIGURE 5. The semipermeable membrane 41 is provided with a filter assembly 42 which is carried within a bushing 43 between the interior of the elastomer bellows 20 and the membrane 41. The semipermeable membrane 41 may be of organic or inorganic materials. A very good semipermeable membrane consists of unglazed porcelain having the pores filled with ferrocyanide of copper. Alternately, ferrocyanide of nickel or cobalt may be substituted for the copper. Organic semipermeable membranes can be made from balloon cloth, certain types of elastomers and the like, depending upon the nature of the fluids in the system. The filter 42 is disposed between the fluids in the system and the semipermeable membrane 41 to prevent particles of dirt from clogging the membrane.

If the liquid in the system is water, and the liquid 31 in the chamber 25 is a solute of water and cane sugar, water will flow from the system through the semipermeable membrane 41 into the chamber 25. The flow of water into the chamber will reduce the volume occupied by the gases 32 and the flow of water will continue until the pressure of the gases in the chamber exceed the pressure within the system by 2.5 atmospheres, providing the concentration of the sugar is 0.1. If the concentration of sugar is 1, the pressure will be exceeded by 25.44 atmospheres. By concentration is meant the number of grams of sugar dissolved in 100 grams of water.

In this manner, osmotic pressure, in combination with semipermeable membranes and the proper selection of solvents and solute can be used to cause liquid to flow into and out of the pressurized chamber and keep the pressure of the pressurized gases in the chamber 25 at any designated pressure above the static pressure in the system. If the pressure in chamber 25 is above the osmotic pressure of solvent and solute 31 with respect to liquid 55 in the inside of bellows 20, liquid 31 will diffuse back into fluid 55 in chamber 57 until the pressure differential across the bellows is equal to the osmotic pressure of the solvent and solute 31.

This principle can be used to advantage when a shipment of surge suppressors are installed in tall buildings, since the solvent will pass in either direction through the semipermeable membrane until the pressure differential across the flexible assembly is equal to the osmotic pressure existing between the two solutions 31 and 55. For example, if the pressure of liquid 55 is 90 p.s.i., liquid 55 will pass through the membrane until the pressure of gas 32 in chamber 25 is 90 p.s.i. plus the osmotic pressure and conversely, if the pressure of liquid 55 in chamber 57 is 30 p.s.i., liquid 31 will flow through the membrane until the pressure of gas 32 is 30 p.s.i. plus the osmotic pressure. It will be seen that a means has been provided for maintaining a fluid seal at a specific pressure when an elastomer bellows made of permeable material is used.

Referring to FIGURES 6 and 7, there is shown an elastomer bellows having the same structure as that shown in FIGURES 1–4, except that the outer rings 23 have been omitted. When this bellows is in the nested position the outer contacting surfaces 44 of the convolutions 24 meet. A small space 45 having a somewhat cross-sectional "tear-drop" shape is formed between the outer contacting surfaces 44. As pressure on the elastomer bellows 20 is increased and it nests, the "tear-drop" opening 45 will collapse and the adjacent surfaces 44 of the convolutions 24 will make contact. The nested bellows shown in FIGURE 6 can be made to withstand the pressure developed when the cavities 35, 36, collapse by molding the bellows so that the curved portions thereof are under compression when the bellows are nested. Alternately, the elastomer may be made thicker at the curved portions than at the flat contacting surfaces 44.

Referring to FIGURES 8 and 9, there is shown an elastomer bellows assembly 47, which may be used where the diameter of the bellows is small or the charging pressure in the chamber 25 is relatively low. In this embodiment, rings 48 having a circular cross-section are substituted for the flat rings 22, 23, previously described in connection with FIGURES 1–4. The rings 48 form a portion of the supporting structure of the bellows 47 and are disposed within and without the convolutions 49 of the bellows 47. The rings 48 keep the bellows from expanding under the influence of pressure or by reason of fluid absorption so that the bellows does not rub against the housing 26 during its operational life. The pressure within the chamber 25 acting on the dome 27 will exert forces on the rings 48. When the bellows has a small diameter or the gas pressure operating on the liquid in the pressurized chamber is small, the force exerted by dome 27 on the nested bellows will not be great enough to cause rings 48 to cut or deform the flat walls of the bellows. As the pressure is increased the force exerted by the dome will increase and before the pressure of gases 32 in chamber 25 have reached a pressure required in practically all systems which develop "water hammer" with the instantaneous closure of a valve, rings 48 will cut through or cause the elastomer to flow until the contacting surfaces 50 of convolutions 49 meet.

The maximum pressure which is exerted on the elastomer when the rings 48 have penetrated into the convolutions a distance equal to one-half the diameter of the rings is difficult to compute. However, calculation of the average pressure acting on the supporting rings 22, 23 of bellows 20 is computable and by selecting a bellows having a relatively small inner diameter compared to the outer diameter, the gases 32 in chamber 25 can be pressurized to several hundred pounds without damaging the elastomer in the bellows.

As previously set forth, one of the methods by which the elastomer bellows can be protected from destruction is to restrict the opening from the inlet pipe or fitting 30 to the interior of the elastomer bellows. Referring to FIGURE 10 there is shown a structure whereby the base 28 has a bottom plate 51 in the nature of a diaphragm which overlies the bottom of the surge suppressor. The plate 51 is provided with a small restricted central opening 40, and the fitting 30 is welded to the plate 51 around the opening 40 and in communication therewith. As a result, the pressure differential developed across the bellows during the life of the transient pressure wave will never become great enough to appreciably stretch the bellows and consequently the elastomer will not be contacted by collapsing cavities 35, 36, when under tension. Moreover, the restricted rate of liquid flow through opening 40 will reduce the rate of cavity collapse and limit the pressure developed by the collapsing cavities to pressures which the unstretched elastomer can withstand without failure.

The remainder of the bellows 20 in FIGURE 10 is identical in construction to that shown in FIGURES 1–4, and is therefore not further illustrated nor herein described. In this embodiment the housing 26 is formed with a shoulder 52 which serves to secure a two-piece base 28 to the housing 26. As illustrated the base 28 consists of the plate 51 and a separate washer-like member 53 which cooperate to retain the bottom convolution 54 of the elastomer bellows 20.

The operation of the surge suppressors described and shown herein will be apparent. Once installed in the line and properly pressurized as hereinabove described, the elastomer bellows remains nested until the arrival of a surge pressure which exceeds the pressure within the chamber 25. The surge pressure causes the elastomer bellows to elongate into the chamber 25 in exactly the same manner as a metal bellows compressing the gas 32 in chamber 25. The energy released which initiated the surge pressure is dissipated by fluid friction and the surge pressure is attenuated and rapidly approaches zero. As the surge pressure drops the bellows again will collapse into its nested position and remain in this state even though the pressure within the line drops below the normal static pressure. In this manner, damaging surges within the line are absorbed and dissipated and the phenomenon known as water hammer is eliminated.

Having thus fully described the invention, what is claimed as new and desired to be secured by Letters Patent of the United States is:

1. The method of maintaining a cup-shaped elastomer bellows having a plurality of transverse corrugations which has been molded in an extended form, under compression at all times within a surge chamber housing which comprises the steps of compressing the bellows longitudinally to flatten the walls of the transverse corrugations, inserting said compressed bellows into a cup-shaped surge suppressor housing, to form a chamber between said housing and the bellows, securing the open end of said compressed bellows across the open end of said surge suppressor housing and at least partially filling the chamber with a fluid under pressure to maintain the bellows under compression at all times.

2. The method according to claim 1 in which the bellows is formed of a semipermeable material and the fluid is a solvent and a solute.

3. The method according to claim 1 in which the bellows is formed of a semipermeable material and the fluid is a solvent and a solute at a pressure of the order of 20 to 30 p.s.i.

4. The method according to claim 1 in which the bellows is formed of a semipermeable material and the fluid is a weak solution of sugar and water.

5. The method of maintaining a cup-shaped elastomer bellows having a plurality of transverse corrugations which has been molded in an extended form, under compression at all times within a surge suppressor housing which comprises the steps of compressing the bellows longitudinally to flatten the walls of the transverse corrugations, inserting said compressed bellows into a cup-shaped surge suppressor housing to form a chamber between said housing and the bellows, securing the open end of said compressed bellows across the open end of said surge suppressor housing and at least partially filling the chamber with a fluid under pressure in an amount sufficient to cover the bellows in the extended position to maintain the bellows under compression at all times.

6. The method of maintaining a cup-shaped elastomer bellows having a plurality of transverse corrugations which has been molded in an extended form, under compression at all times within a surge chamber housing which comprises the steps of compressing the bellows longitudinally to flatten the walls of the transverse corrugations, inserting said compressed bellows into a cup-shaped surge suppressor housing, to form a chamber between said housing and the bellows, securing the open end of said compressed bellows across the open end of said surge suppressor housing and at least partially filling the chamber with a fluid under pressure above the static operating pressure of the bellows to maintain the bellows under compression at all times.

7. The method of maintaining a cup-shaped elastomer bellows having a plurality of transverse corrugations which has been molded in an extended form, under compression at all times within a surge suppressor housing which comprises the steps of compressing the bellows longitudinally to flatten the walls of the transverse corrugations, inserting said compressed bellows into a cup-shaped surge suppressor housing to form a chamber between said housing and the bellows, securing the open end of said compressed bellows across the open end of said surge suppressor housing and at least partially filling the chamber with a fluid under pressure in an amount sufficient to cover the bellows in the extended position above the static operating pressure of the bellows to maintain the bellows under compression at all times.

References Cited

UNITED STATES PATENTS

| | | | |
|---|---|---|---|
| 2,682,893 | 7/1954 | Ziebold | 92—45 X |
| 2,828,769 | 4/1958 | Cooper | 138—30 |
| 3,001,268 | 9/1961 | Greer | 29—157 |
| 3,099,189 | 7/1963 | Blondiau | 138—30 X |

CHARLIE T. MOON, *Primary Examiner.*